May 19, 1936.                B. D. KUNKLE                2,041,191
                           LUBRICATING SYSTEM
                       Filed July 13, 1932          2 Sheets-Sheet 1

Inventor
Bayard D. Kunkle
by
Spencer Hardman & Fehr
his Attorneys

May 19, 1936.　　　B. D. KUNKLE　　　2,041,191
LUBRICATING SYSTEM
Filed July 13, 1932　　　2 Sheets-Sheet 2

Inventor
Bayard D. Kunkle
By Spencer Hardman & Fehr
his Attorneys

Patented May 19, 1936

2,041,191

UNITED STATES PATENT OFFICE 2,041,191

LUBRICATING SYSTEM

Bayard D. Kunkle, Dayton, Ohio, assignor, by mesne assignments, to General Motors Corporation, Detroit, Mich., a corporation of Delaware Application July 13, 1932, Serial No. 622,179

1 Claim. (Cl. 308—126)

This invention relates to a lubricating system, and more particularly to a system that circulates the lubricant so as to lubricate rotating meshing gears and a bearing for a shaft.

It is among the objects of this invention to provide a lubricating system that permits and causes the continuous circulation and supply of lubricant to the bearing or frictional surfaces when in operation.

Another object of this invention is to provide a lubricating system which operates to circulate lubricant when the device with which it is used is in operation.

Another object of this invention is to provide a means for preventing the lubricant from leaking or being carried away along a lubricated shaft either when the machine is idle or in operation.

Another object of this invention is to provide a lubricating system, which while efficient and economical in operation, may also be quickly and easily assembled.

Further objects and advantages of the present invention will be apparent from the following description, reference being had to the accompanying drawings wherein a preferred embodiment of one form of the present invention is clearly shown.

In the drawings:

Fig. 1 is a sectional view of a structure embodying the present invention.

Fig. 2 discloses an enlarged fragmentary sectional view of a portion of the structure disclosed in Fig. 1.

Figure 1:
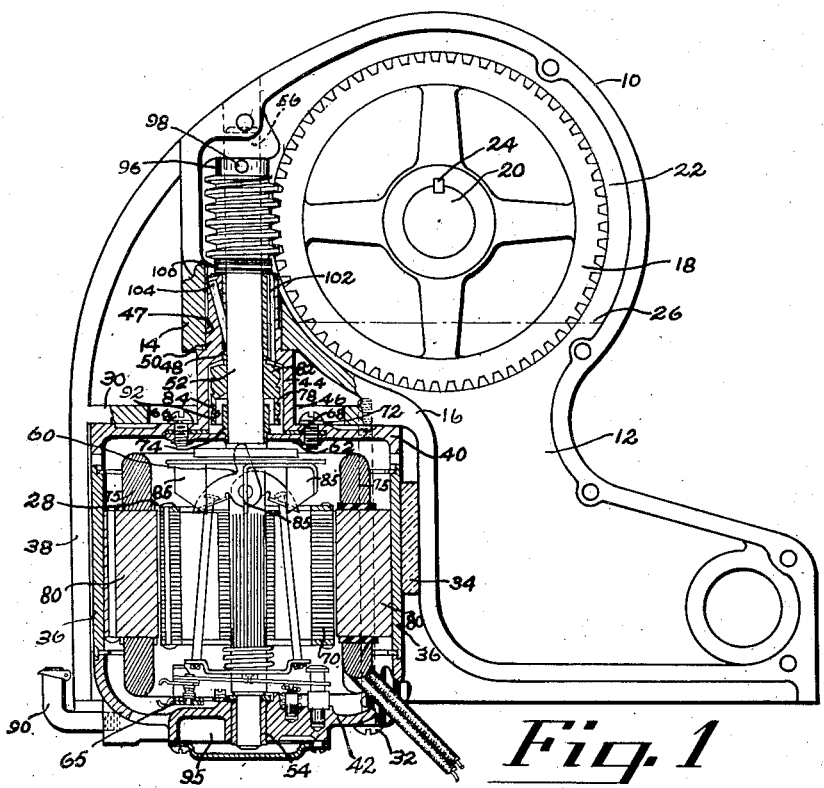

With particular reference to Fig. 1, a housing 10 is formed so as to provide a reservoir or lubricant supply chamber 12. A bearing positioning member 14 is formed integrally with, and adjacent to a side wall 16 of the reservoir 12. A gear 18 is keyed as at 24 to a shaft 20. The level of the lubricant in the reservoir substantially reaches a normal and preferably maximum position indicated by a dot-and-dash line 26, so that gear 18 constantly dips into the supply of lubricant.

A motor or prime mover 28 is mounted on and supported by a wall 30 of the housing 10 by screws as 32. A pad 34 of any suitable cushioning material, such as felt, is interposed between the wall 16 of the housing and a side wall 36 of the motor 28. A portion 38 of the housing 10 forms a skirt over the motor 28. End covers 40 and 42 complete the enclosure of the motor 28 partially formed by the side wall 36. An annular sleeve 44 formed on the cover 40 projects through an aperture 46 in the wall 30 and forms a support for a journal bearing 48. The sleeve 44 has a portion 50 press fitted into an aperture 47 in the bearing positioning member 14. The bearing 48 provides the bearing for one end of a shaft 52 of the motor 28, while a bearing 54 mounted in the cover 42 supports the other end of the shaft 52. The shaft 52 extends through the bearing 48 to an aperture 56 provided by the housing 10.

Since the motor disclosed does not form a part of the present invention, it is believed that the following description of its internal structure will be sufficient in the present application. 60 refers to a centrifugally actuated mechanism for operating a switch 65. That is, when the motor speed rises to a predetermined value, the centrifugal mechanism 60 opens the contacts of the switch 65 to open the circuit to the starting winding of the motor 28. A rotor 70 mounted on the shaft 52 is a conventional squirrel cage type of rotor. Stator windings 75 are wound on pole structures 80 which are secured to the side walls 36. Fins 85 cause the circulation of air to cool the motor when running. An oiler 90 operatively connected with an oil receiving chamber 95 provides a means for lubricating the bearing 54.

Figure 2:
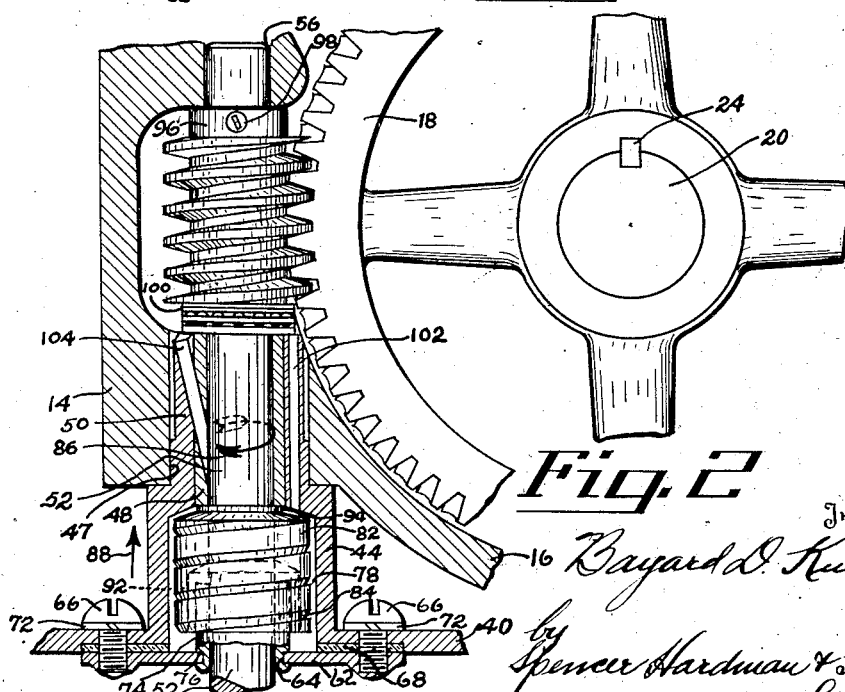

As better disclosed in Fig. 2, a disc 62, having an aperture 64 through which the shaft 52 passes, is secured to the cover 40 by screws 66. A gasket 68 interposed between the cover 40 and the disc 62 prevents leakage of lubricant through the joint thus formed. Lock washers 72 are provided for the screws 66. A sleeve member 74 surrounds a portion of the shaft 52, and has a groove 76 near one end which engages the disc 62 to form a joint that will not permit the leakage of lubricant. A chamber 78 is formed within the sleeve 44 and adjacent the disc 62 for the accommodation of a lubricant conveying member 82. The lubricant conveying member 82 comprises a cylinder having spirally disposed grooves 84 cut on its periphery. As disclosed, the grooves 84 are cut in such a way that when the shaft 52 rotates in a direction as indicated by an arrow 86, the grooves will tend to convey the lubricant in a direction as indicated by an arrow 88. The cylindrical lubricant conveying member 82 has a hollow portion 92 at one end, into which the sleeve 74 projects. A collar 94, at one end of the cylindrical member 82, spaces the end of the member 82 from the end wall of the chamber 78.

Also mounted on the shaft 52, and fastened thereto by any suitable means such as a set screw 98, is a worm gear 96 that meshes with the gear 18. A ball thrust bearing 100 is mounted around the shaft 52 and interposed between the bearing 48 and the worm gear 96. A passage 104 is provided in the sleeve 44 and the bearing 48 to permit lubricant from the gear 96 to lubricate the bearing 48, and pass through the bearing into the chamber 78. A passage 102 in the sleeve 44 provides a communicating opening to permit lubricant to flow from the chamber 78 back to the reservoir 12.

Figure 3:
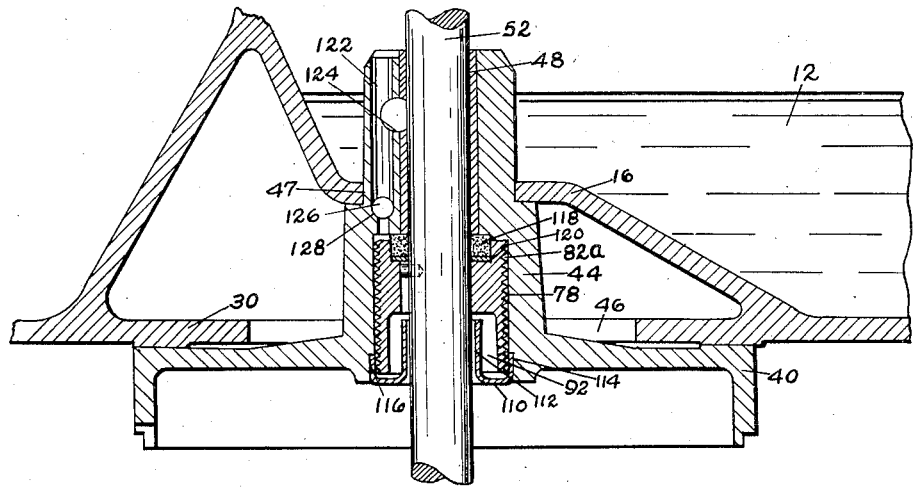
Fig. 3 is a sectional fragmentary view showing a modification of the system.

With particular reference to Fig. 3, parts bearing the same reference numerals as those previously used are similar in structure and perform similar functions. However, in this modification an annular channel member 110 has a channel wall 112 that surrounds a portion of the shaft 52 and another channel wall 114 that engages the periphery of an aperture 116 in the cover 40. The lubricant receiving chamber 78 is thus formed within the sleeve 44 and the annular channel member 110. The cylindrical lubricant conveying member 82a, in this modification, is disclosed as having a greater number of grooves cut in its periphery than the similar member disclosed in Fig. 1. A washer of lubricant absorbing material 118 and a washer 120 surround a portion of the shaft 52 and are interposed between the bearing 48 in the cylindrical member 82a. The side 112 of the annular channel member 110 projects into the hollow portion 92 of the cylindrical member 82a. A passage 122 in the sleeve 44 permits the lubricant to flow to an auxiliary opening 124 in the sleeve 44 and the bearing 48 to lubricate the latter, and also forms a communicating passage for the flow of lubricant from the chamber 78 to the reservoir 12. A ball 126 is disposed in the passage 122 so as to be free to move in that passage or rest on a seat 128 formed by the sides of the passage.

Figure 4:
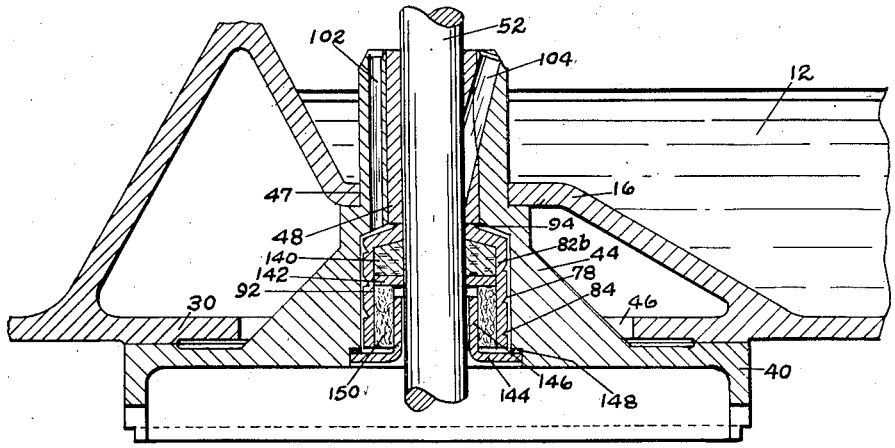
Fig. 4 is a sectional fragmentary view showing another modification of the lubricating system.

With particular reference to Fig. 4, reference numerals used in this figure which have been used in previous figures will refer to similar parts which perform similar functions. In this modification, the cylindrical oil conveying member 82b is indirectly mounted on the shaft 52. That is, the hollow portion 92 of the member 82b extends a greater distance into the member 82b than in the previous modifications, and an annular member 140 serves as a driving connection between the shaft 52 and the cylindrical member 82b. The annular member 140 is preferably made of a material that it will provide a good frictional engagement between that member and the shaft 52 as well as with the cylindrical member 82b. It is also preferable that the material be one which will permit sliding the cylindrical member 82b longitudinally on the shaft in the assembly so that it may be quickly and easily located at the proper position in the assembly. A washer 142 is mounted on the shaft 52 adjacent the annular member 140. A flanged annular member 144 has a flange 146 which surrounds a portion of the shaft 52 and extends into the hollow portion 92 of the cylindrical member 82b. A gasket 148 is interposd between, and forms a joint with the cover 40 and the member 144 that will not permit the leakage of lubricant therethrough. An annular ring 150 of oil absorbing material is interposed between the flange 146 and the member 82b. A passage 104 permits the flow of lubricant to the bearing 48, while the passage 102 is provided for the return of the lubricant to the reservoir 12.

In the operation of the structure disclosed in Figs. 1 and 2, the motor 28 drives the shaft 52 and turns the cylindrical member 82 and the worm gear 96. The worm gear, in turn, drives the gear 18. The gear 18 picks up lubricant from the supply in the reservoir 12 to lubricate the frictional surfaces of the meshing gears 18 and 96. Excess lubricant from the gear 96 lubricates the ball thrust bearing 100 and flows through the passage 104 to the bearing 48, and thence into the chamber 78. Centrifugal force imparted to the lubricant by the cylindrical member 82 tends to force the oil to the passage or space between the cylindrical member 82 and the wall of the chamber 78. Then, assuming the direction of rotation as indicated by the arrow 86 in Fig. 2, the lubricant is conveyed by the spirally disposed grooves 84 in the cylindrical member 82, in a direction corresponding with that of the arrow 88. The lubricant is thus forced through the passage 102 and back to the reservoir 12. Hence, it may be seen that the cylindrical member 82 acts as a lubricant pump, and utilizes centrifugal force in its operation, as well as the conveying action of the spirally disposed lubricant conveying grooves. Since some lubricant will always be in the bottom of the chamber 78, it is necessary to provide a means for preventing that lubricant from leaking out of the chamber 78 along the shaft and into the motor. The annular sleeve member 74 forms a seal with the disc 62 and extends along the shaft to a heighth greater than that reached by the level of the lubricant in the chamber under normal operating conditions. When the machine is stopped, some of the lubricant which was in the process of circulation will flow into the chamber 78. Hence, to prevent that lubricant from leaking into the motor along the shaft, the sleeve member 74 extends beyond the level reached by the lubricant in the chamber 78.

In the operation of the modification disclosed in Fig. 3, lubricant flows into the passage 122, and since the ball 126 seals the passage the lubricant will rise to a sufficient heighth to pass through the passage 124 to lubricate the bearings. The annular ring 118 of lubricant absorbing material tends to reduce the rapidity of flow of the lubricant from the bearing. When sufficient lubricant accumulates in the chamber 78, the cylindrical member 82a tends to force the lubricant out of the chamber into the passage 122. When the force of the lubricant reaches the value sufficient to open the valve formed by the ball 126, the lubricant may flow out through the passage 122. Since this structure is adapted for slower circulation in the lubricant than the system disclosed in Figs. 1 and 2, a greater number of grooves have been cut on the surface of the cylindrical member 82 and the pitch of the groove is consequently reduced. The rate at which the cylindrical member 82a may convey the lubricant is proportional to the pitch of the groove and the speed of rotation. The flange 112 extends beyond the normal level of the lubricant in the chamber 78 when the shaft is either rotating or stationary. The joint between the member 110 and the cover 40 forms a seal through which lubricant cannot pass.

In the operation of the device as disclosed in Fig. 4, the cylindrical member 82b is driven by the shaft through the engagement of each with the member 140. If the cylindrical member is driven directly by the shaft as in the previously explained modification, and the driving relation is brought about by having a shrink fit between the shaft and cylindrical member, the cylindrical member must be quite accurately placed at the time it is mounted on the shaft in order to fit properly into the assembly. By using any suitable material such as cork for a member 140, sufficient frictional engagement may be had between that material and the shaft to drive the cylindrical member and pump the lubricant, and yet the cylindrical member may be moved along the shaft slightly in the assembly of the complete system in order to locate it in its proper position. The washer 142 and the lubricant absorbing material 150 prevent lubricant from working between the frictionally engaged surfaces of the shaft and the member 140. The joint between the member 144, the gasket 148 and the cover 140 provides a seal between those members through which lubricant cannot pass.

While the form of embodiment of the present invention as herein disclosed, constitutes a preferred form, it is to be understood that other forms might be adopted, all coming within the scope of the claim which follows.

What is claimed is as follows:

A lubricating system comprising, in combination, a lubricant supply chamber having a supply of lubricant therein; a bearing support adjacent to the lubricant supply chamber, and having a bearing supported thereby, said bearing support and bearing providing cooperating lubricant conducting passages therein and an auxiliary chamber; a shaft rotatably mounted in said bearing and extending into the auxiliary chamber; one of said passages providing communication between said chambers, and the other of said passages providing communication to said bearing; valve means in said one passage restricting the flow therethrough in one direction; and lubricant pumping means within the auxiliary chamber and driven by the shaft for forcing lubricant through one of said passages from the auxiliary chamber to the supply chamber.

BAYARD D. KUNKLE.